United States Patent [19]

Takizawa

[11] Patent Number: 4,818,063
[45] Date of Patent: Apr. 4, 1989

[54] OPTICAL MODULATING/SWITCHING DEVICE

[75] Inventor: Kuniharu Takizawa, Tokyo, Japan

[73] Assignee: Nippon Hoso Kyokai, Tokyo, Japan

[21] Appl. No.: 835,284

[22] Filed: Mar. 3, 1986

[30] Foreign Application Priority Data

Mar. 15, 1985 [JP] Japan .................................. 60-51837

[51] Int. Cl.[4] .............................................. G02B 6/10
[52] U.S. Cl. .................................. 350/96.13; 350/96.14
[58] Field of Search ........................... 350/96.13, 96.14

[56] References Cited

U.S. PATENT DOCUMENTS 4,262,993 4/1981 Burns et al. ....................... 350/96.14
4,291,939 9/1981 Giallovenzi et al. ........... 350/96.1 X

FOREIGN PATENT DOCUMENTS 0020846 2/1977 Japan .............................. 350/96.1 X

OTHER PUBLICATIONS

R. G. Hunsperger, "Integrated Optics; Theory and Technology", Springer-Verlag, N.Y. 1982, p. 135.
H. Kogelink, "Integrated Optics: Theory of Dielectric Waveguides", Springer-Verlag, N.Y. 1975, p. 13.
J. S. Wilkinson, "Design and Performance of a Low Crosstalk Directional Coupler Switch", IEEE Proceedings, vol. 131, Pt.H., No. 5, Oct. 1984, pp. 304–308.
G. B. Hocker, "Strip-Loaded Diffused Optical Waveguides", IEEE Journal of Quantum Electronics, vol. QE-12, No. 4, Apr. 1976, pp. 232–236.
A. Neyer and W. Sohler, "High Speed Cutoff Modulator Using a Ti–Diffused LiNbO3 Channel Waveguide", Appl. Phys. Lett. (35)(3) 1 Aug. 1979, pp. 256–258.

Primary Examiner—Gene Wan
Attorney, Agent, or Firm—Saidman, Sterne, Kessler & Goldstein

[57] ABSTRACT

An optical element comprising: a substrate; an optical waveguide arranged on the substrate; and flat electrodes disposed asymmetrically about the optical waveguide. An electric field is applied through the flat electrodes to the substrate and the optical waveguide so that a refractive index of a portion of the substrate in the vicinity of the optical waveguide is varied to interrupt a light beam propagating through the optical waveguide. The optical modulation, optical switching or the like can be carried out by electrically controlling the difference between refractive indices of the optical waveguide and the substrate in the horizontal direction, so that the nonuniformity of the refractive index of the optical waveguide which causes some problems in conventional branching interference type optical modulator and directional optical coupler do not cause any problem. The optical element has a higher light extinction ratio and the output light is by far stabilized against the variation in temperature.

39 Claims, 19 Drawing Sheets

PRIOR ART

OPTICAL MODULATING/SWITCHING DEVICE

BACKGROUND OF THE INVENTION

1. FIELD OF THE INVENTION

The present invention relates to an optical element in which an optical waveguide and flat electrodes are mounted on a substrate and an electric field is applied through the flat electrodes to the substrate and the optical waveguide so that the refractive index of a portion of the substrate adjacent to the optical waveguide is varied to interrupt a light beam propagating through the optical waveguide, and more particularly to an optical element which is well adapted for use as an optical modulator for converting an electrical signal into a light signal or an optical switch for permitting or interrupting the propagation of a light signal through an optical fiber or an optical waveguide and which ensures a high light extinction ratio (i.e. ratio of maximum output light intensity to minimum output light intensity), low insertion loss and a high-speed operation.

2. DESCRIPTION OF THE PRIOR ART

Optical modulators and directional optical couplers utilizing the electro-optical effect have been widely used in order to perform a high-speed operation of an optical modulator or optical switch.

Typical optical elements of the type described above are (1) a Mach-Zehnder type thin-film optical modulator (Reference is made to R. G Hunsperger, "Integrated Optics: Theory and Technology", Springer-Verlag, New York, 1982, P. 135), employing single-mode optical waveguides formed into a Y branching path and a Y coupling path, in which the phase difference between two light beams is electrically controlled and (2) a thin-film directional optical coupler having two single-mode optical waveguides spaced apart from each other in which optical energy is synchronously transferred from one guide to the other (ibid., p. 129).

In either element, it is required that the distribution of an electric field of a light beam, the distribution of a refractive index of an optical guide, and the distribution of an applied electric field must be made uniform in the two optical waveguides in order to attain a higher light extinction ratio. However, it has not been easy to increase the light extinction ratios of these optical elements, because of: (1) a complex spatial profile of the refractive index, since an optical waveguide is generally fabricated by the diffusion of impurities; (2) the use of flat electrodes incapable of establishing a uniform electric field within an optical waveguide.

Furthermore, in order to maintain a high light extinction ratio, it is essential that an applied voltage must be controlled precisely and the temperature must be kept constant at a high degree of accuracy. This results in a complicated structure of an optical element.

In addition to the optical elements described above, there has been devised and demonstrated a cutoff type thin-film optical modulator (Reference is made to A. Neyer and W. Sohler, "Appl. Phys. Lett., Vol. 35, (1979) p. 256") in which a refractive index of a straight optical waveguide is electrically controlled so that an incident light beam is guided or radiated into a substrate.

An example of the prior art cutoff type thin-film optical modulators is shown in FIG. 27. In FIG. 27, reference numeral 1 designates a substrate upon which an optical waveguide 2 is formed. Flat electrodes 3A and 3B are placed on both sides of a narrow portion as shown in FIG. 27 and in symmetrical relationship about the axis of the optical waveguide 2. An input prism coupler 5A is placed on the input end of the optical waveguide 2 in order to couple a light beam into the optical waveguide 2, while an output prism coupler 5B is placed on the output end of the optical waveguide 2 in order to receive the light beam propagated to the output end of the optical waveguide 2.

In the prior art cutoff type thin-film optical modulator of the type described above, a guided light beam is converted into a radiated light beam by electrically controlling the difference in refractive indices between the optical waveguide 2 and the substrate 1 underneath the waveguide 2 (in other words, the modulator is operated into the cutoff mode). In such a modulator it is difficult to achieve a sufficiently high light extinction ratio because of the following reasons:

(1) The refractive index of the surface of the optical waveguide 2 is considerably greater than that of the substrate, so that even when the following reason (2) to be described below can be eliminated, a high voltage must be applied in order to decrease the refractive index in order to radiate the guided light beam into the -X-direction.

(2) The intensity of the electric field in the substrate 1 generated by applying a voltage to the flat electrodes 3A and 3B is gradually reduced along the -X-direction, so that a considerably high voltage must be applied in order to reduce the difference in refractive indices between the optical waveguide 2 and the substrate 1 underneath the waveguide.

SUMMARY OF THE INVENTION

In view of the above, the primary object of the present invention is to provide an optical element in which flat electrodes are placed on both sides of an optical waveguide, so that a light extinction ratio higher than that by a prior art optical element.

According to the present invention, an optical element comprises: a substrate; an optical waveguide arranged on the substrate; and flat electrodes disposed asymmetrically about the optical waveguide. An electric field is applied through the flat electrodes to the substrate and the optical waveguide so that a refractive index of a portion of the substrate in the vicinity of the optical waveguide is varied to interrupt a light beam propagating through the optical waveguide.

Here, the optical waveguide may be straight. A first flat electrode of the flat electrodes may be spaced apart by a predetermined distance from one side edge of the optical waveguide or aligned with the one side edge of the optical waveguide. A second flat electrode of the flat electrodes may be spaced apart by a predetermined distance from the other side edge of the optical waveguide.

A portion of the first flat electrode may be disposed on the optical waveguide; and one side edge of the first flat electrode may be in line with the one side edge of the optical waveguide or may be spaced apart therefrom by a predetermined distance.

A third flat electrode of the flat electrodes may be disposed on the substrate and spaced apart by a predetermined distance from the first flat electrode on the side opposite to the second flat electrode with respect to the optical waveguide.

Alternatively, the optical waveguide may have a curved portion. The first flat electrode may be disposed on the outer side of the optical waveguide in such a way that one side of the first flat electrode is aligned with the outer side edge of the curved portion of the optical waveguide or is spaced apart therefrom by a predetermined distance. The second flat electrode may be disposed on the inner side of the curved portion of the optical waveguide in such a way that the second flat electrode is spaced apart from the inner side edge of the curved portion of the optical waveguide by a predetermined distance.

Alternatively, the optical waveguide may have a curved portion. The first flat electrode may have a portion overlying the optical waveguide and may be disposed on the inner side of the optical waveguide in such a way that one side edge of the flat electrode is aligned with the outer side edge of the curved portion of the optical waveguide or is spaced apart therefrom by a predetermined distance. The second flat electrode may be disposed on the outer side of the curved portion of the optical waveguide and may be spaced apart from the first flat elctrode by a predetermined distance.

Here, the third flat electrode of the flat electrode may be disposed on the inner side of the curved portion of the optical waveguide and may be spaced apart from the first flat electrode by a predetermined distance.

Impurities for reducing a refractive index of the substrate can be diffused in a portion of the substrate between a portion adjacent to the one side edge of the optical waveguide and the second flat electrode, a portion under the second flat electrode and a portion adjacent thereto.

Impurities for reducing a refractive index of the substrate can be diffused in a portion of the substrate under the first flat electrode and a portion of the substrate adjacent thereto.

Impurities for increasing a refractive index of the substrate can be diffused into a portion of the substrate adjacent to the one side edge of the optical waveguide, a portion of the optical waveguide under the first flat electrode and a portion of the substrate adjacent thereto.

Impurities for increasing a refractive index of the substrate can be diffused into a portion of the substrate between a portion adjacent to the one side edge of the optical waveguide and the second flat electrode, a portion of the substrate under the second flat electrode and a portion of the substrate adjacent thereto.

The above and other objects, effects, features and advantages of the present invention will become more apparent from the following description of preferred embodiments in conjunction with the accompanying drawings.

DETAILED DESCRIPTION OF PREFERRED EMBODIMENTS

Figure 1:
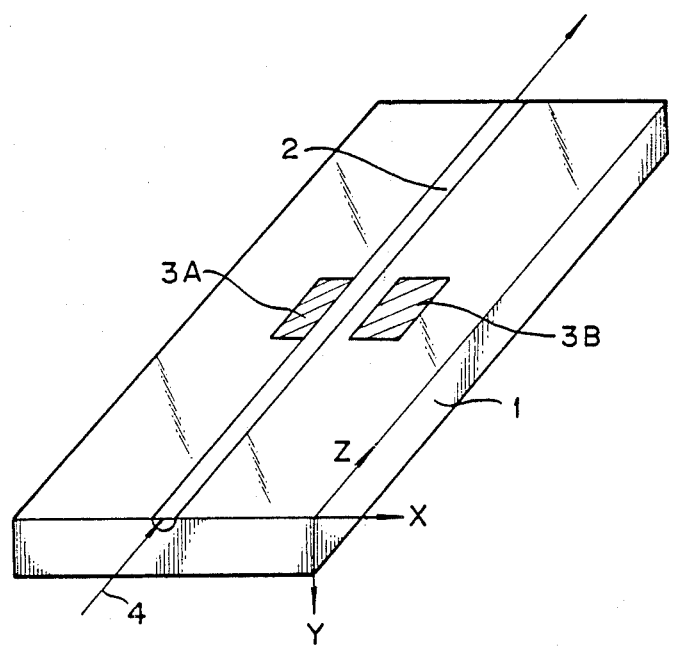
FIG. 1 is a perspective view showing a first embodiment of an optical element in accordance with the present invention.

Referring first to FIG. 1, a first embodiment of the present invention will be described. In FIG. 1, reference numeral 1 designates a crystal which constitutes a substrate; 2, an optical waveguide formed on the substrate 1; and 3A and 3B, flat electrodes which are placed on both sides of the optical waveguide 2. One of the flat electrodes 3A and 3B (in the first embodiment 3A) is placed adjacent to the optical waveguide 2.

Figure 2:
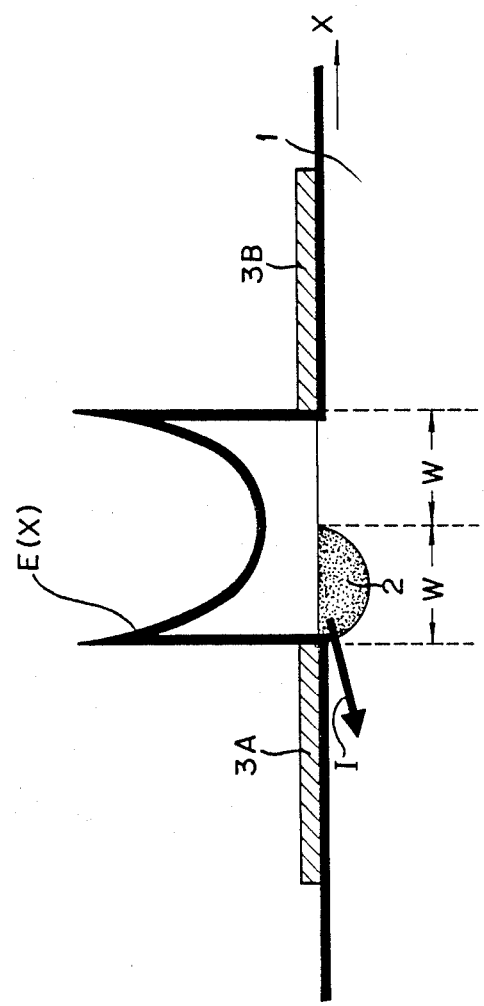
FIG. 2 is an explanatory diagram used to explain an X-direction distribution of an electric field applied to the optical element shown in FIG. 1.

With the optical element of the type described above, when a voltage is applied between the flat electrodes 3A and 3B, the lateral profile of the X component E (X) of the electric field at the surface of the substrate 1 is shown in FIG. 2. It is seen that the field intensity between the flat electrodes 3A and 3B is remarkably different from the field intensity just below the flat electrodes. When an electric field is applied to the substrate 1 which is made of a crystal, a refractive index of the crystal varies through the electro-optic effect, piezoelectric effect, optical elastic effect and so on.

Figure 3:
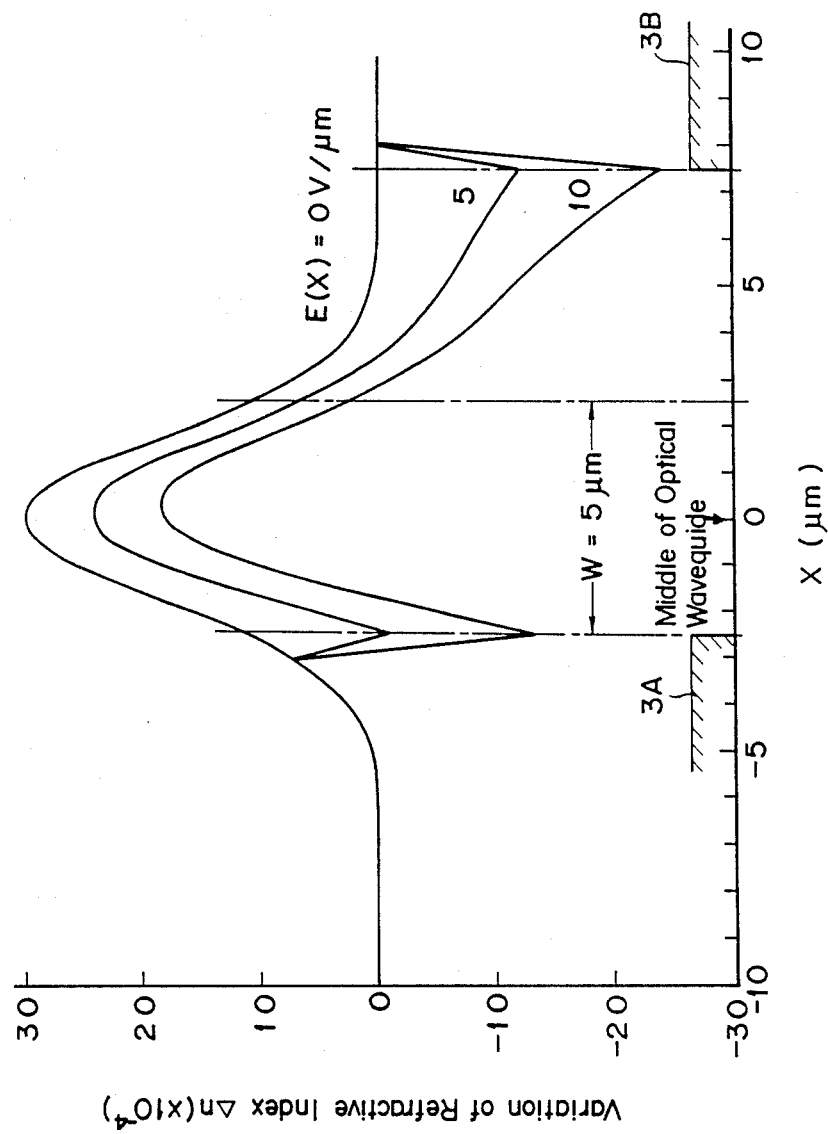
FIG. 3 illustrates lateral profiles of refractive index for applied electric fields at an optical waveguide and the surface of a substrate.

FIG. 3 illustrates the dependence of the refractive index profile in the X-direction on an electric field applied to the optical waveguide 2 and the surface of the substrate 1 adjacent to the optical waveguide 2. The width of the optical waveguide 2 is 5 μm and the origin of the X-direction is located at the center of the optical waveguide 2.

In the first embodiment, the following conditions are taken into consideration. These conditions are reasonable in the case of the fabrication of a conventional optical element:

(1) A refractive index profile in the X-direction of the optical guide 2 exhibits a Gaussian function;

(2) The profile of the X component E (X) of the electric field in the X-direction between the electrodes may be expressed in terms of a quadratic equation; and (3) The X components E (X) of the electric field in the X-direction under the flat electrodes 3A and 3B are zero.

FIG. 3 shows that when a voltage is applied between the electrodes 3A and 3B, not only the refractive index profile in the direction of depth but also the refractive index profile in the X-direction exhibits asymmetry. As reported by G. B. Hocker in "IEEE Journal of Quantum Electronics, Vol. QE-12, p. 232 (1976)", an effective index of refraction method, in which the effective index of refraction is calculated by changing the width W and the depth D of the strip optical waveguide so as to be $W = \infty$ with keeping D unchanged and $D = \infty$ with keeping W unchanged, is used to analyze the relationship between the width W of the optical waveguide which suppports a guided light beam and the applied electric field E (X). In order to analyze the relationship between W and E (X) using the above described method, it was assumed the following assumptions have been employed; (i) the field intensity E (X) has a constant value, which is independent of X, between the electrodes and is zero under the electrodes. (ii) The refractive index of the substrate is 2.2. (iii) The difference between the refractive index at the surface of the optical waveguide and the refractive index of the substrates is $3 \times 10^{-3}$. (iv) The thickness in the direction of depth of the optical waveguide is 2 μm. (v) The wavelength of the incident light is 632.8 nm. The results obtained from the analysis using the effective index of refraction method are shown in FIG. 4.

Figure 4:
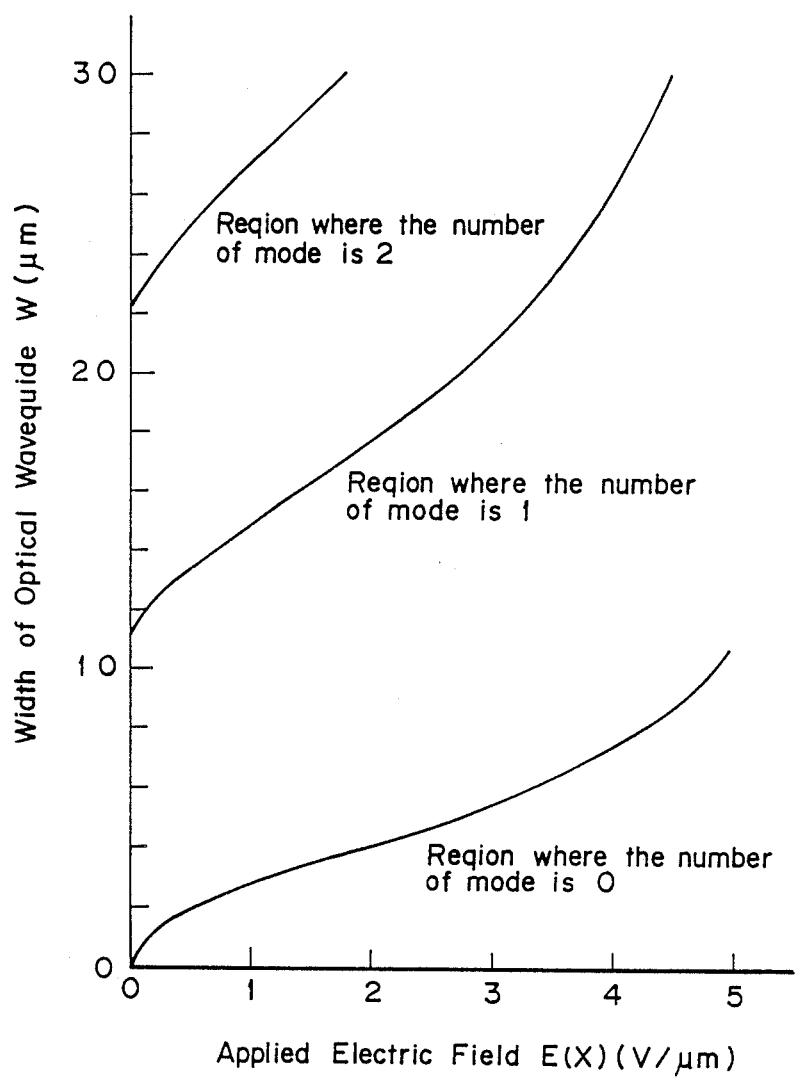
FIG. 4 is an explanatory diagram used to explain operation of the first embodiment of the optical element and illustrates the relationship between the width W of the optical waveguide which supports a guided light beam and the applied electric field E (X)

It is seen from FIG. 4 that when the width of the optical waveguide W is narrow, the cutoff condition even for a single mode light wave is satisfied in the X-direction when a low electric field is applied. For instance, when the width W of the optical waveguide is 4 μm, the cutoff condition is satisfied with E $(X) \geq 2(V/\mu m)$. If the cutoff condition in the X-direction is satisfied, the effective refractive index (which determines a velocity of a light beam which propagates the optical waveguide) becomes lower than that of the substrate under the electrode, so that the confinement of the light beam within the optical waveguide is reduced and consequently the light beam radiates into the substrate under the electrode adjacent to the optical waveguide. This phenomenon is indicated by an arrow I in FIG. 2.

The widths of the electrodes 3A and 3B placed on the both sides of the optical waveguide 2 may be equal to each other as shown in FIG. 2, but it is possible to make the width of the electrode 3A placed adjacent to the optical waveguide 2 larger or smaller than that of the electrode 3B.

In either case, the optical modulation can be carried out. In the case of an optical element shown in FIG. 1 in which the electrode 3A placed adjacent to the optical waveguide 2 is narrower in width than the electrode 3B, the difference between the electric field at the optical waveguide 2 and the electric field at the substrate 1 under the electrode is greater than the difference in other case. As a result, a higher light extinction rate can be obtained.

A detailed embodiment of an optical element in accordance with the present invention which has the arrangement as shown in FIG. 1 will be described in more detail hereinafter. The substrate 1 was made of a Y-cut $LiNbO_3$ (lithium niobate) crystal and Ti (titanium) was deposited 4 μm in width and 300 Å in thickness and then heated for four hours in the air at 1000° C., whereby the straight optical waveguide 2 was formed. Aluminum electrodes 3A and 3B having a length of 4 mm were formed on both sides of the optical waveguide 2 by a vacuum deposition method. The width of the electrode 3A adjacent to the optical waveguide 2 was 50 μm while the width of the electrode 3B was 2 mm.

Figure 5:
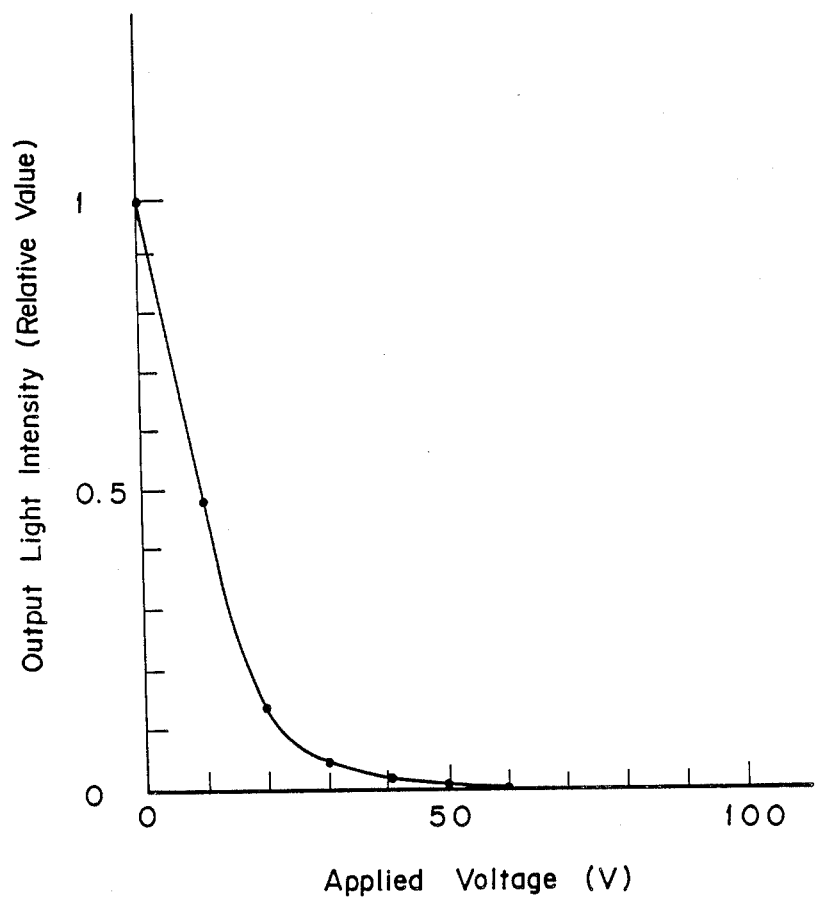
FIG. 5 is an explanatory diagram used to explain the mode of operation of the first embodiment and illustrates the relationship between the output light intensity and the applied voltage.

The experimentally determined dependence of the output light power on the applied voltage is shown in FIG. 5. When the applied voltage is driven from zero to 170 V, the light extinction ratio higher than 56 dB is obtained.

So far the directional optical coupler fabricated by Wilkinson et al. (England) has exhibited a light extinction ratio of 35 dB, but the present invention exhibits a light extinction ratio much higher than 35 dB.

Figure 6:
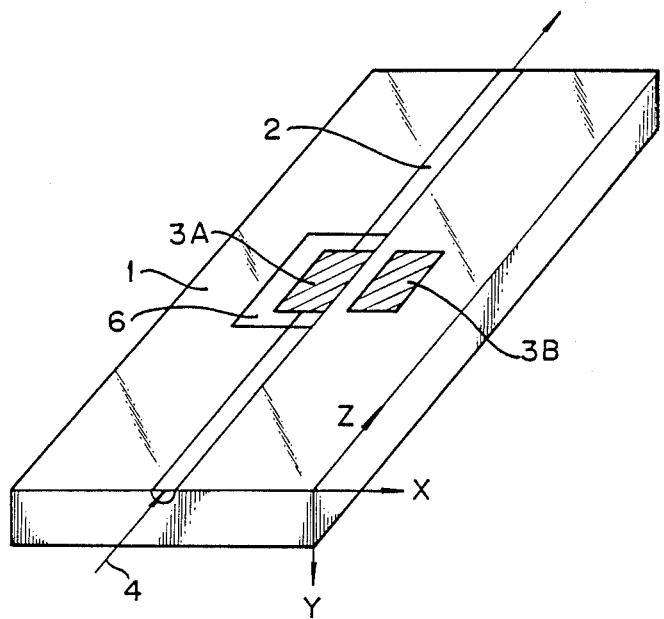
FIG. 6 is a perspective view showing a second embodiment of an optical element in accordance with the present invention.

Referring next to FIG. 6, a second embodiment of the present invention will be described. Reference numeral 1 designates a crystal which constitutes a substrate as in the case of the first embodiment. One electrode (for instance, 3A) is placed over an optical waveguide 2 in such a way that one side edge (shown on the right side in FIG. 6) of the optical waveguide 2 and the electrode 3A are aligned with each other.

The mode of operation of the second embodiment will be described with reference to FIG. 7. In the second embodiment, when a voltage is applied between the electrodes 3A and 3B, the Y component E(Y) of the electric field just under the electrodes 3A and 3B becomes remarkably different from that of the electric field between the electrodes. In the second embodiment, the above-described phenomenon is utilized to change the refractive index of the optical waveguide 2 and the refractive indices of the substrates on both sides of the optical waveguide 2. In order to prevent the guided light beam from being absorbed by the electrode 3A, a thin non-metallic film 6 with a refractive index lower than that of the optical waveguide 2 must be inserted as a buffer layer between the electrode 3A and the optical waveguide 2. Then, the light beam can be prevented from being absorbed by the metallic flat electrode 3A.

Figure 7:
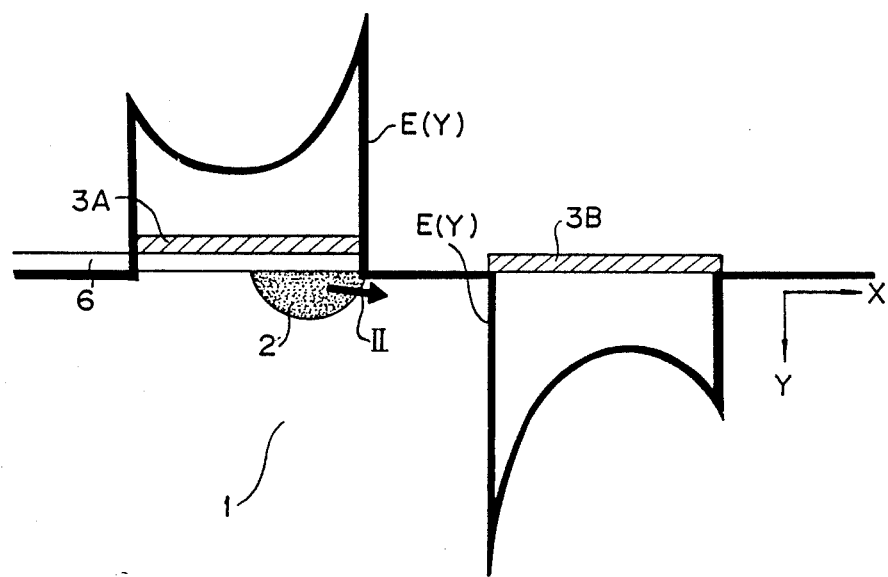
FIG. 7 is an explanatory diagram used to explain an X-direction profile for a Y component of an electric field applied to the optical element shown in FIG. 6.

In the second embodiment, when the cutoff condition in the X-direction is satisfied by the application of an electric field; that is, when a refractive index of the optical waveguide 2 is reduced to a value very close to the refractive index of the substrate 1, the light beam is radiated into the substrate 1 between the electrodes 3A and 3B as indicated by an arrow II in FIG. 7. According to the second embodiment of the present invention, as compared with the first embodiment as shown in FIG. 1, the distance between the electrodes 3A and 3B can be decreased so that the optical modulation or switching can be carried out at a lower voltage.

Figure 8:
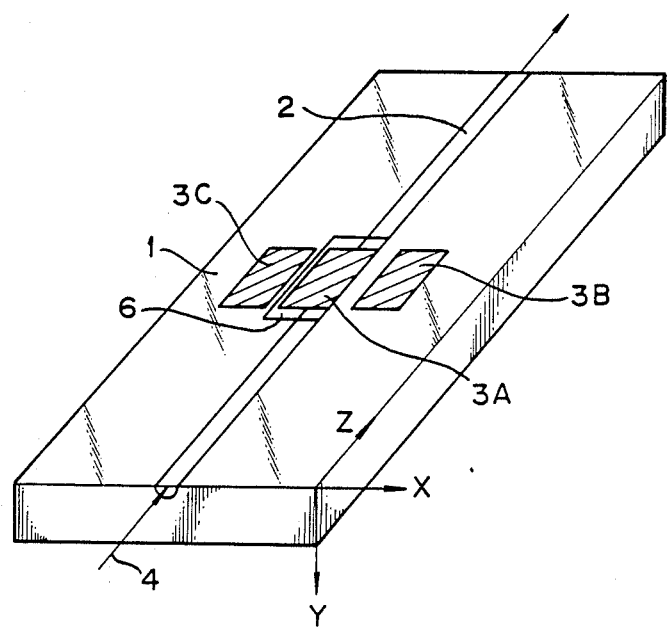
FIG. 8 is a perspective view showing a third embodiment of an optical element in accordance with the present invention.
Figure 9:
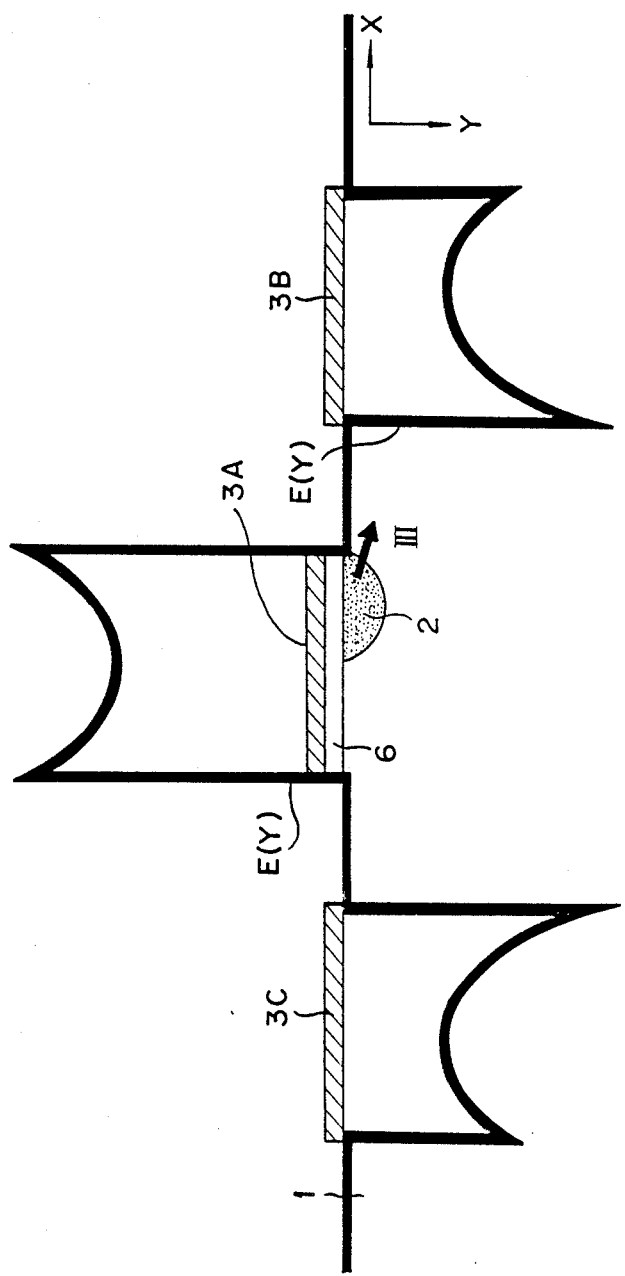
FIG. 9 is an explanatory diagram used to explain an X-direction profile for a Y component of an electric field applied to the optical element shown in FIG. 8.

Referring next to FIG. 8, a third embodiment of the present invention will be described. The third embodiment is substantially similar in arrangement to the second embodiment as shown in FIG. 6 except that a third flat electrode 3C is placed in the vicinity of the flat electrode 3A in such a way that the electrodes 3B and 3C sandwich the electrode 3A. The mode of operation of the third embodiment is substantially similar to that of the second embodiment described above with reference to FIG. 6, but because the third flat electrode 3C induces another electric field, the Y component E(Y) of the applied electric field just under the flat electrode 3A becomes larger than that of the electric field established as shown in FIG. 6, so that the optical modulation can be carried out at a lower voltage. The profile of the refractive index becomes asymmetrical and the light wave radiates into the substrate as indicated by an arrow III.

Figure 10:
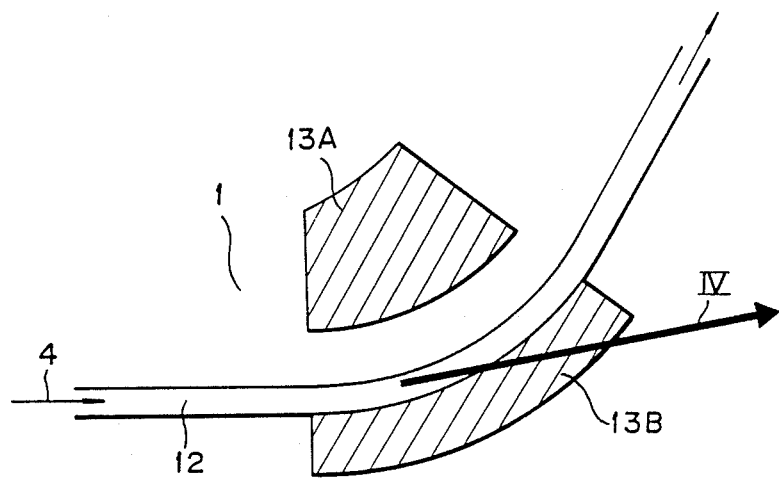
FIGS. 10–12 are top views illustrating a fourth, a fifth and a sixth embodiments of an optical element in accordance with the present invention.

Next, referring to FIG. 10, a fourth embodiment of the present invention will be described. An optical waveguide 12 having a curved portion is placed on a substrate 1 which is substantially similar to that as shown in FIG. 1 and an outer electrode 13B is placed adjacent to the curved portion of the optical waveguide 12, while an inner electrode 13A is placed on the opposite side of the optical waveguide 12 and is spaced apart therefrom by a predetermined distance. The two electrodes 13A and 13B are substantially in parallel with the optical waveguide 12. In the optical waveguide 12, a light beam propagates straightly, so that the confinement of the light beam becomes weak in the curved portion of the optical waveguide 12. As a result, the optical element of the fourth embodiment can modulate a light beam at a light extinction ratio higher than that of the optical element as shown in FIG. 1. When a voltage is applied to this optical element so that the cutoff condition is satisfied, the propagating light beam is radiated into the substrate 1 under the electrode 13B as shown by an arrow IV in FIG. 10.

Figure 11:
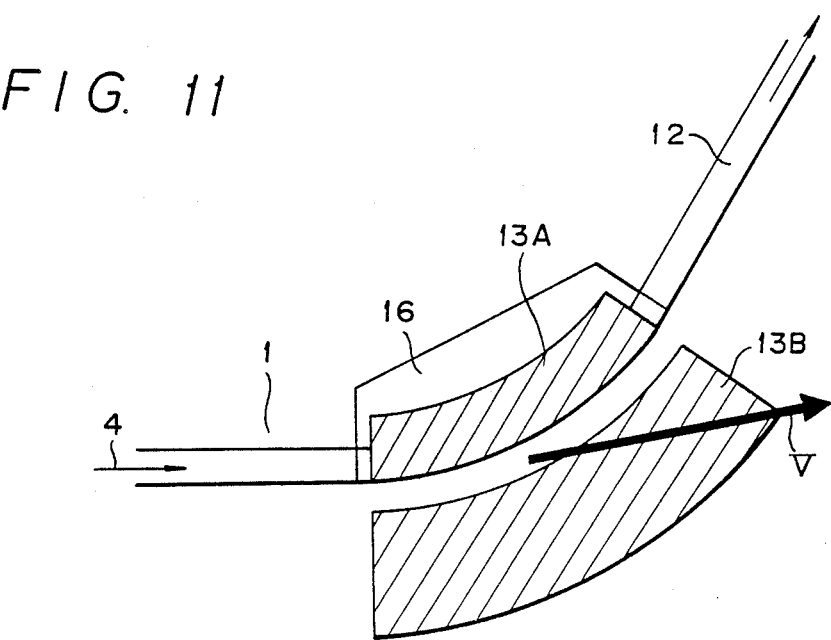

FIG. 11 shows a fifth embodiment of the present invention. In this embodiment, an optical waveguide 12 having a curved portion is placed on a substrate 1 which is substantially similar to that shown in FIG. 6. An inner electrode 13A is placed over the optical waveguide 12 in such a way that their outer arcuate sides are aligned with each other while the outer electrode 13B is spaced apart from the optical waveguide 12 by a predetermined distance. The two electrodes 13A and 13B are substantially in parallel with the optical waveguide 12. As in the case of the optical element shown in FIG. 6, a buffer layer 16 is interposed between the electrode 13A and the optical waveguide 12.

In the fifth embodiment, as in the case of the fourth embodiment described above with reference to FIG. 10, the confinement of a light beam within the optical waveguide 12 having the curved portion becomes weak, so that the optical modulation can be carried out at a light extinction ratio by far higher than that of the optical element as shown in FIG. 6. When a voltage is applied to this optical element of the fifth embodiment, so that the cutoff condition is satisfied, the propagating light beam is radiated into the substrate 1 between the electrodes 13A and 13B as indicated by an arrow V in FIG. 11.

Figure 12:
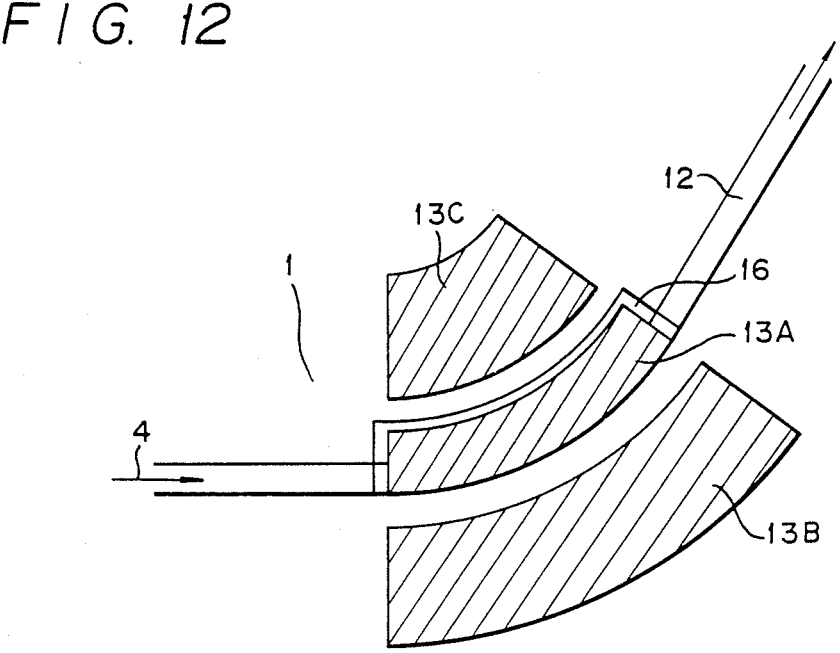

FIG. 12 shows a sixth embodiment of an optical element in accordance with the present invention which is substantially similar in arrangement to the fifth embodiment described above with reference to FIG. 11 except that a third flat electrode 13C is placed adjacent to and spaced apart by a predetermined distance from the electrode 13A radially inwardly in such a way that the third electrode 13C and the electrode 13B sandwich the flat electrode 13A.

The mode of operation of the sixth embodiment is substantially similar to that of the optical element described with reference to FIG. 8. Due to the provision of the third flat electrode 13C, the electric field component in the direction perpendicular to the plane of FIG. 12 under the middle electrode 13A is increased as compared with the electric field component in the direction perpendicular to the plane of the optical element as shown in FIG. 11, so that the sixth embodiment can carry out the optical modulation at a voltage lower than a voltage which must be applied to the optical element as shown in FIG. 11.

Next, referring to FIGS. 13–18, further embodiments of the present invention will be described. The optical elements shown in FIGS. 13, 14, 15, 16, 17 and 18 are substantially similar in arrangement to those described above with reference to FIGS. 1, 6, 8, 10, 11 and 12, respectively. That is, each of them comprises a substrate 1, an optical waveguide 2 or 12 and flat electrodes 3A, 3B and 3C or 13A, 13B and 13C, but it further comprises a substrate portion 11 or 21 into which no propagating light beam is radiated even in the cutoff mode and into which impurities are diffused so that a refractive index of the substrate 1 is decreased.

Figure 13:
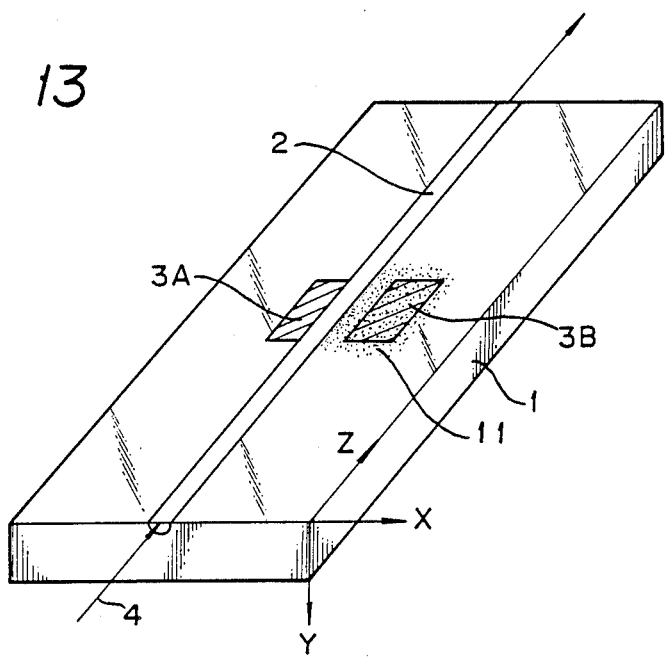
FIGS. 13–15 are perspective views illustrating further embodiments of an optical element in accordance with the present invention.
Figure 14:
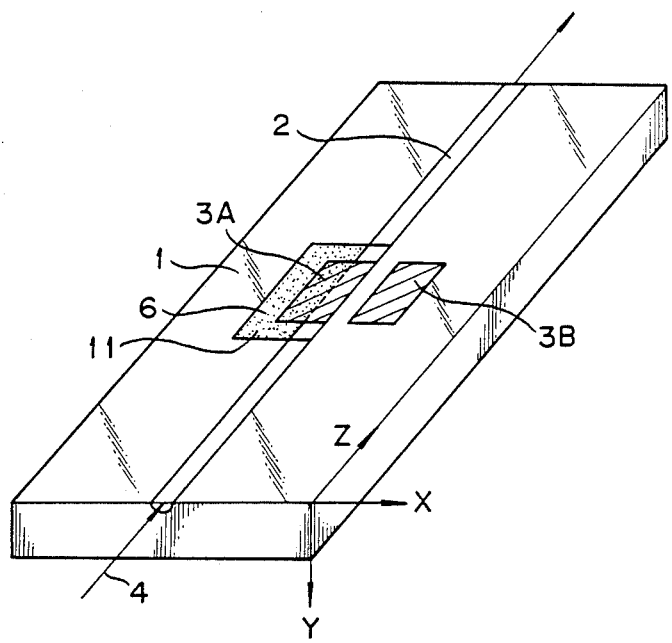
Figure 15:
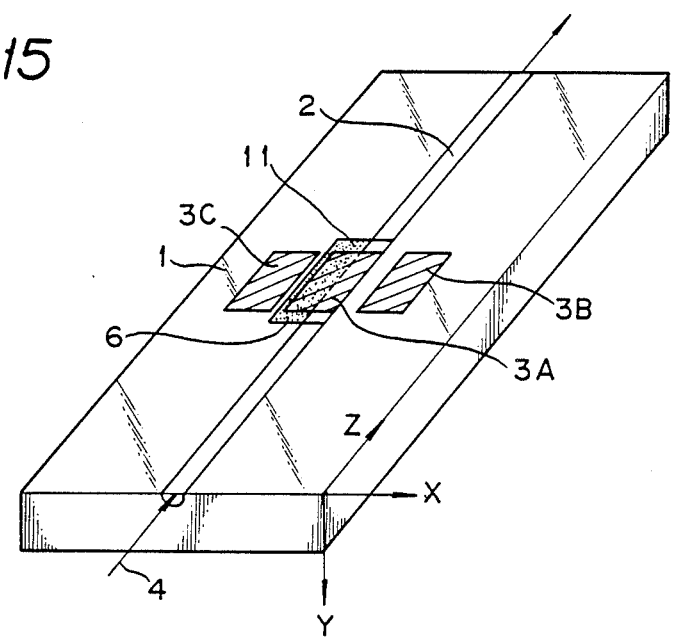
Figure 16:
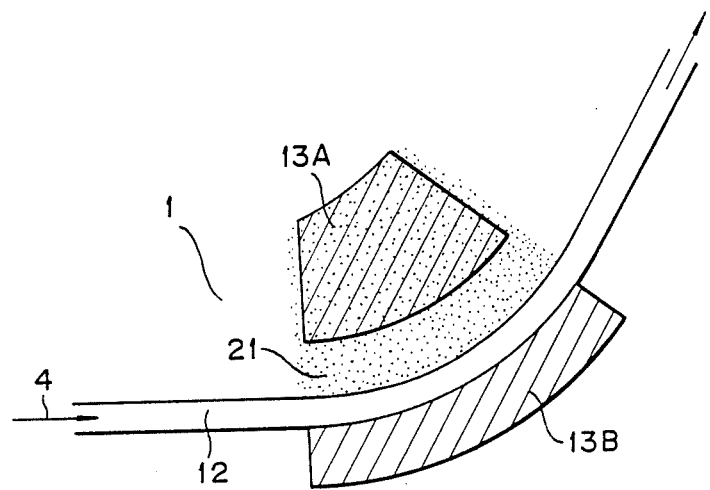
FIGS. 16–18 are top views illustrating yet further embodiments of an optical element in accordance with the present invention.
Figure 17:
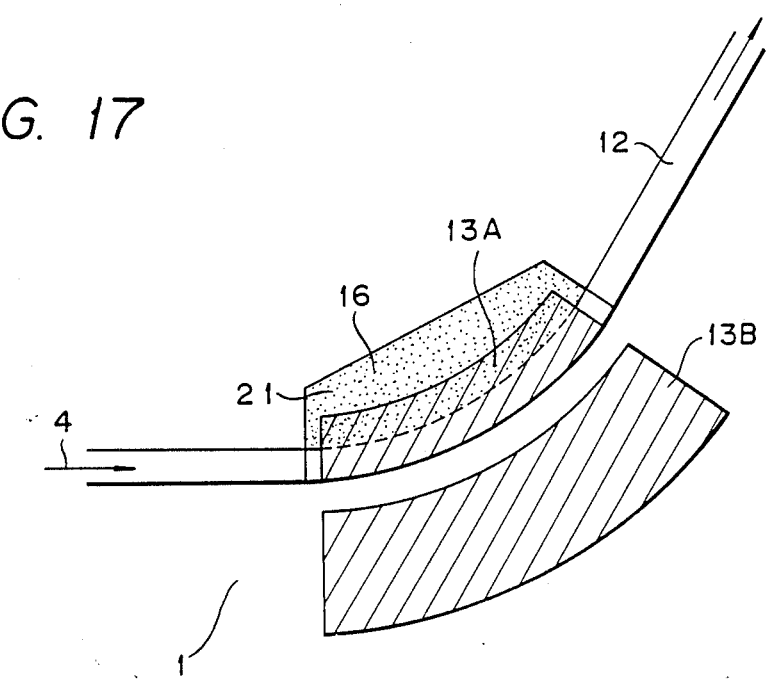
Figure 18:
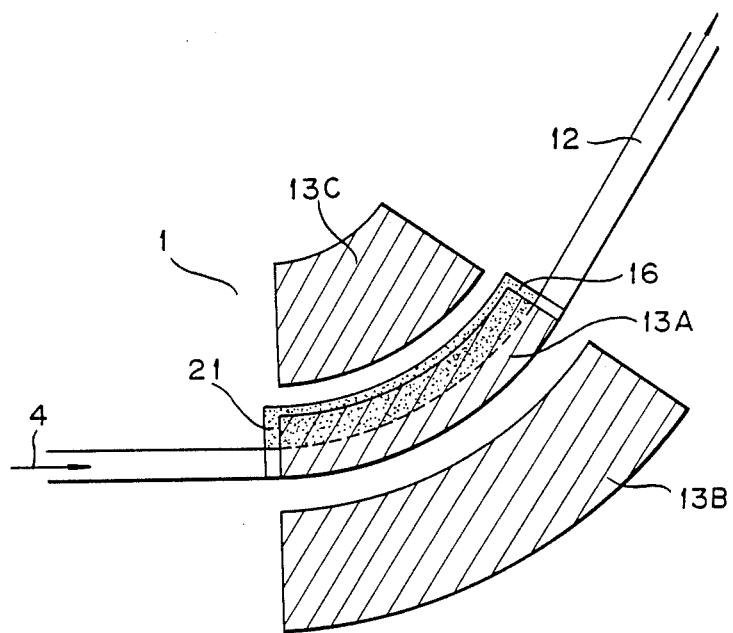

The modes of operation of these optical elements are substantially similar to those of the corresponding optical elements described above, so that the effect of the diffusion of impurities will be described below only in conjunction with the optical element as shown in FIG. 13.

Referring to FIG. 13, the influence of the impurity diffusion upon the cutoff condition, in which the light beam radiates into the substrate 1, may be quantatively analyzed by using the effective index of refraction method. First, the width W of the optical waveguide 2 is infinitely extended so as W=∞ with keeping the depth D of the waveguide 2 unchanged. The effective index of refraction $n_f$ of this slab waveguide (The slab waveguide is described in detail by T. Tamir in "Integrated Optics", Springer Verlag, N.Y., 1975, p. 13) can be calculated by using the effective index of refraction method. In a second step, the depth of the optical waveguide 2 is infinitely extended with keeping the width W unchanged. When a refractive index of the substrate 1 is $n_s$ and a wavelength of a light beam propagating in vacuum is λ, the normalized cutoff width H of the second slab waveguide, in which a light wave of the fundamental mode radiates into the substrate 1, is given by $$H = \frac{2\pi}{\lambda} W \sqrt{n_f^2 - n_s^2} = \tan^{-1} \sqrt{\frac{2n_s (\Delta n_e + \Delta n_a)}{n_f^2 - n_s^2}}$$

The above-described equation is described in detail by T. Tamir in "Integrated Optics", Springer Verlag, N.Y., 1975, pp. 23–24. In the above-described equation, $\Delta n_e$ represents a decrement in the refractive index of the substrate 1 when an electric field is applied and $\Delta n_a$ represents a decrement in the refractive index of the substrate 1 due to the diffusion of impurities.

Figure 19:
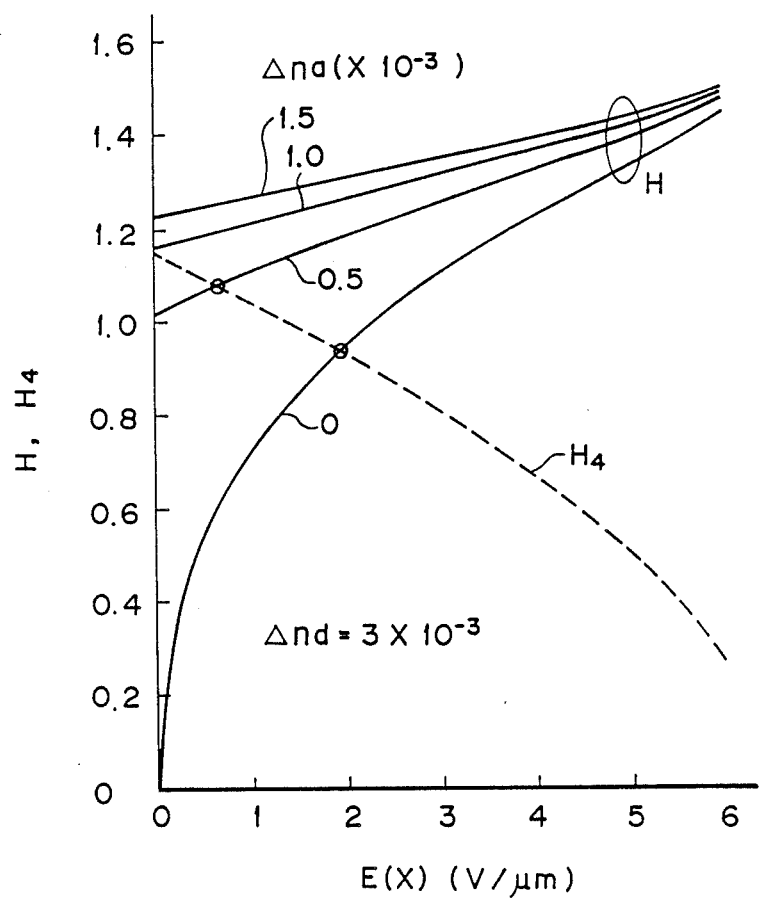
FIG. 19 is an explanatory diagram used to explain the mode of operation of an optical element in accordance with the present invention and illustrates the dependence of a normalized width H of an optical waveguide upon an applied electric field in the cutoff mode.

In the case that the difference $\Delta n_d$ between refractive indices of the surface of the optical waveguide 2 and the substrate 1 is $3\times10^{-3}$, the dependence of normalized cutoff width H of the optical waveguide 2 upon the applied electric field E(X) with $\Delta n_a$ as a parameter is shown by the solid-line curves in FIG. 19. The narrower the width W of the optical waveguide 2 becomes; that is, the smaller the value of H, the greater the quantity of light which leaks into the substrate 1 becomes.

Therefore, the cutoff condition is satisfied in the region below each solid-line curve. The greater the quantity of diffused impurities and the higher the applied electric field, the greater the cutoff region is expanded. Therefore, it is seen that it becomes easier to drive the optical element into the cutoff mode. In the case of an optical element whose optical waveguide has an actual width $W_4=4$ μm, the effect of the impurity diffusion will be clarified. The normalized width $H_4$ of the optical waveguide having the width $W_4$ is given by $$H_4 = \frac{2\pi}{\lambda} W_4 \sqrt{n_f^2 - n_s^2}.$$

Since the refractive index of the optical waveguide 2 is decreased in response to the increase in applied electric field E(x), $H_4$ is also decreased as indicated by the broken-line curve shown in FIG. 19. The value of E(X) at the intersection between $H_4$ and H represents a minimum field intensity required for cutting off a light beam and it is seen that the intersection is shifted to the side of lower field intensity in response to the increase in $\Delta n_a$. For instance, when $\Delta n_a$ is increased from 0 to $0.5\times10^{-3}$, it is seen that the field intensity required for driving the optical element into the cutoff mode is 30% of the field intensity required for driving an optical element which is not diffused with impurities into the cutoff mode.

The optical elements having impurities thus diffused in accordance with the present invention are different from six types of embodiments described above in that a refractive index profile in the horizontal direction is made asymmetrical so that they can carry out the optical modulation at a voltage by far lower than a voltage required to drive the six embodiments with the same arrangements of the optical waveguide and electrodes.

Still further embodiments of the present invention will be described below with reference to FIGS. 20-25. The optical elements as shown in FIGS. 20, 21, 22, 23, 24 and 25 are substantially similar to those as shown in FIGS. 1, 6, 8, 10, 11 and 12, respectively, in that each of them comprises a substrate 1, an optical waveguide 2 or 12 and flat electrodes 3A, 3B and 3C or 13A, 13B and 13C except that each of them is provided with a substrate portion 31 or 41 into which the propagating light beam is radiated in the cutoff mode and which is diffused with impurities so that a refractive index of the substrate portion 31 or 41 is increased.

Figure 20:
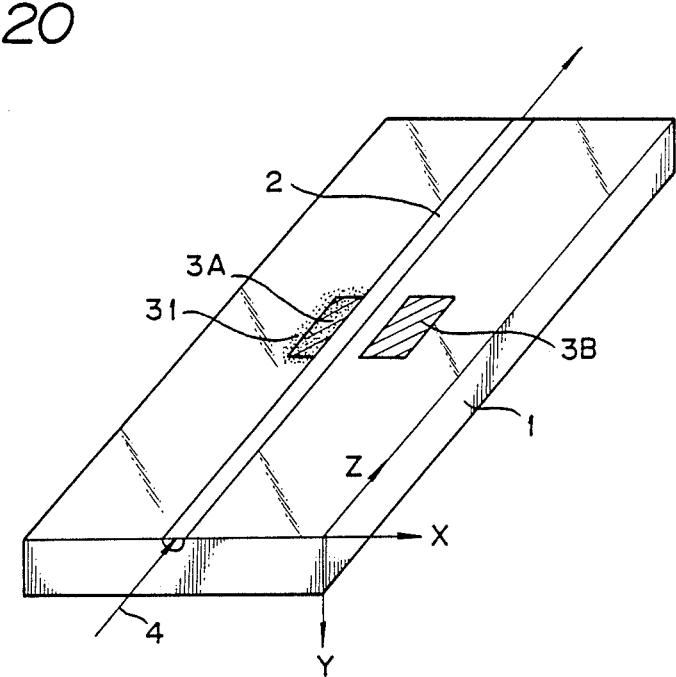
FIGS. 20–22 are perspective views showing still further embodiments of an optical element in accordance with the present invention.
Figure 21:
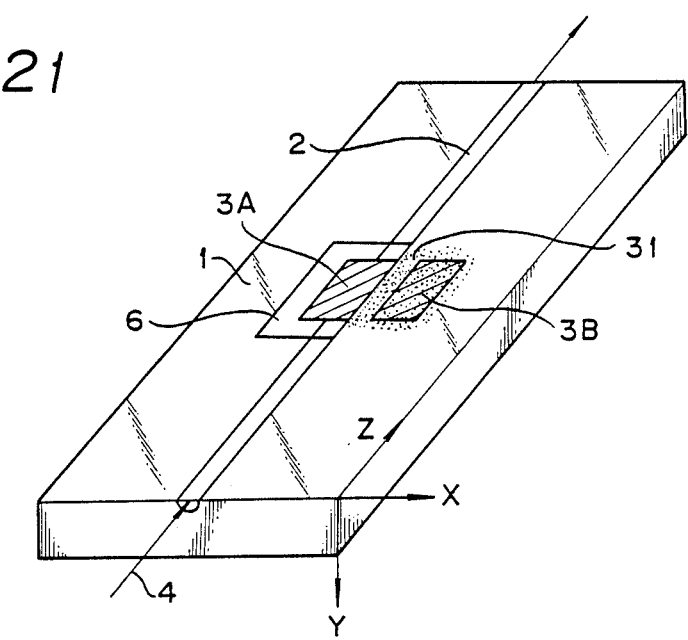
Figure 22:
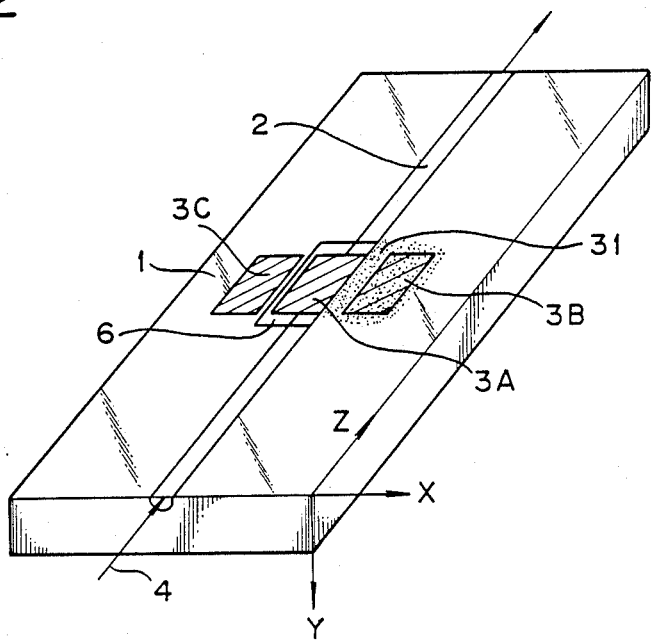
Figure 23:
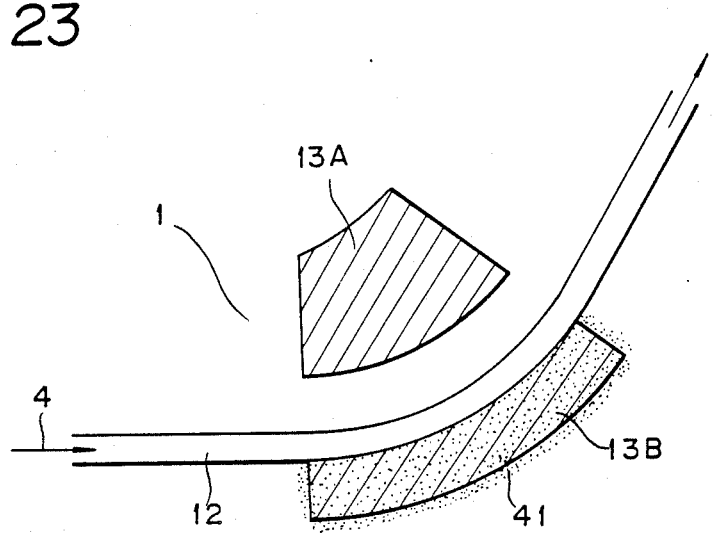
FIGS. 23–25 are top views illustrating further embodiments of an optical element in accordance with the present invention.
Figure 24:
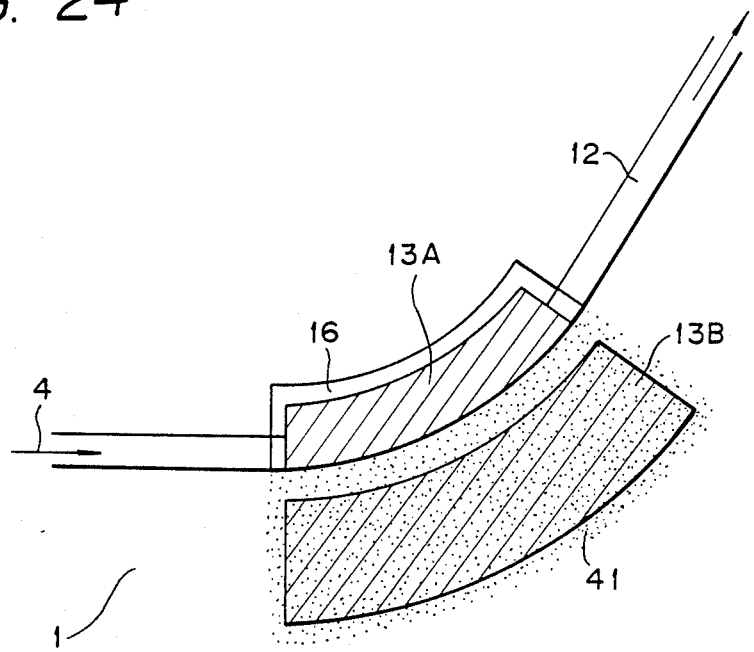
Figure 25:
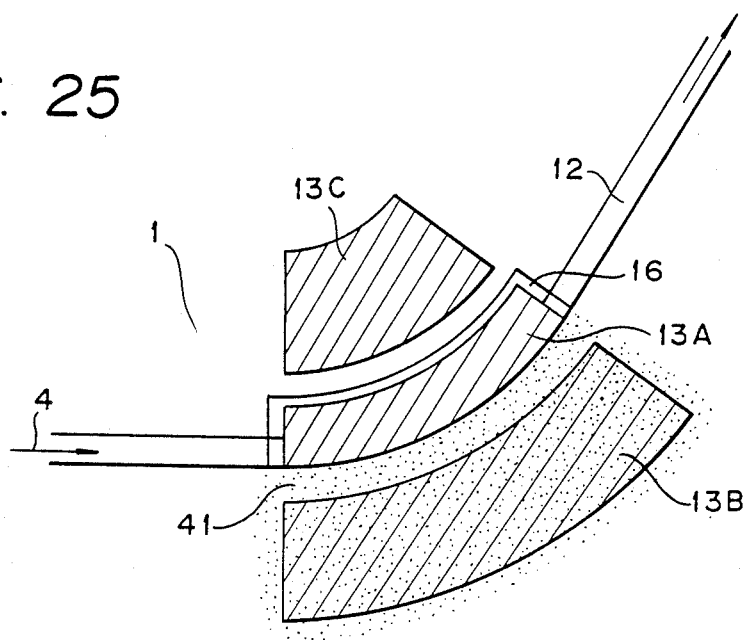

The modes of operation of these optical elements are substantially similar to those of the corresponding optical elements described above so that the effect of diffused impurities will be described below only with reference to the optical element as shown in FIG. 20.

Figure 26:
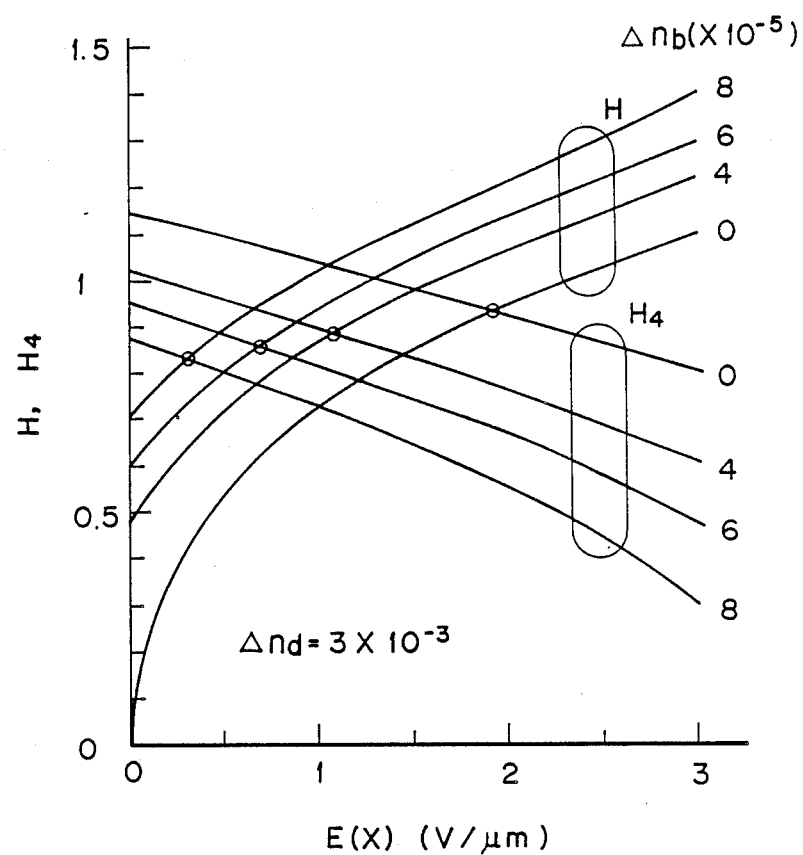
FIG. 26 is an explanatory diagram used to explain the mode of operation of an optical element in accordance with the present invention and illustrates the dependence of a normalized width (H) of an optical waveguide in the cutoff mode and of a normalized width (H4) of an optical waveguide, whose actual width is 4 μm, upon an applied electric field.
Figure 27:
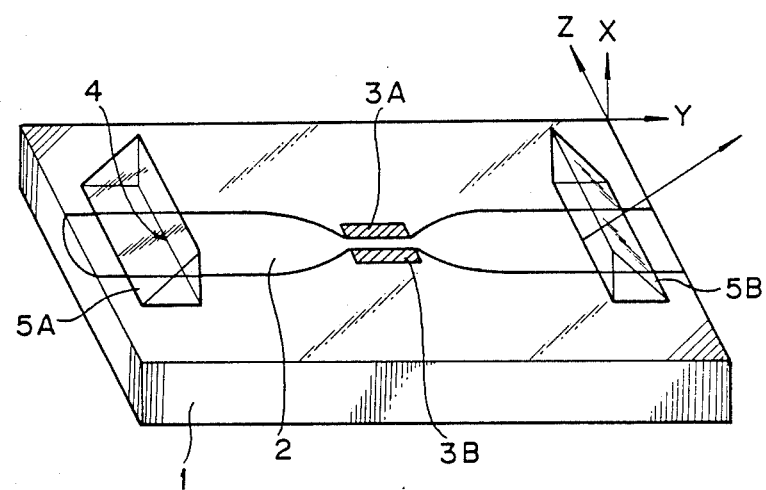
FIG. 27 is a perspective view illustrating the construction of a prior art cutoff type thin-film optical modulator.

FIG. 26 shows the dependence of the normalized cutoff width H of the optical waveguide where a single-mode beam is radiated into the substrate 1 and the normalized width $H_4$ of the optical waveguide whose actual width is 4 μm upon the applied electric field in the case that the difference $\Delta n_d$ between refractive indices of the surface of the optical waveguide and the substrate is $3\times10^{-3}$. Here, a parameter $\Delta n_b$ indicates an increment in refractive index of the substrate due to the diffusion of impurities. Various conditions of FIG. 26 are the same as those of FIG. 4. As in the case of FIG. 19, the intersection of curve H and curve $H_4$ represents a minimum field intensity required for driving the optical element into the cutoff mode and it is seen that the higher the parameter $\Delta n_b$, the lower the applied electric field at which the optical element is driven into the cutoff mode becomes.

The optical elements in accordance with the present invention have a double feature in that a refractive index profile of the substrate 1 in the horizontal direction is made asymmetrical due to the diffusion of impurities into the substrate 1 and that the normalized width of the optical waveguide is decreased. Therefore, as compared with the optical elements having the same arrangement of the optical waveguide and electrodes without impurities diffusion, the optical modulation can be carried out at a lower electric field.

As described above, in the optical elements in accordance with the present invention, the optical modulation, optical switching or the like can be carried out by electrically controlling the difference between refractive indices of the optical waveguide and the substrate in the horizontal direction, so that the nonuniformity of the refractive index of the optical waveguide which causes some problems in conventional branching interference type optical modulator and directional optical coupler do not cause any problem in the present invention.

In addition, as compared with conventional optical modulator and optical switch in which a phase of the propagating light beam is controlled, an optical element in accordance with the present invention has a higher light extinction ratio and the output light is by far stabilized against the variation in temperature. Furthermore, in accordance with the present invention, light loss is smaller than that of the conventional device. A length of an optical element can be made less than one quarter or one third of those of the component parts in a conventional Mach-Zehnder type optical element and directional optical coupler. The fabrication of the optical element in accordance with the present invention is much facilitated.

As it is clear from the first embodiment as shown in FIG. 1, the optical element in accordance with the present invention has an extremely high light extinction ratio, so that it can be used as optical attenuator.

Most of conventional optical attenuators have been utilizing the phenomenon that metal absorbs light and there has been devised and demonstrated an optical attenuator in which light is attenuated by varying the thickness of a thin metal film. However, it has some defects that it is too large in size and too heavy in weight and that the degree of attenuation is manually varied so that light cannot be attenuated at a higher rate.

The optical element in accordance with the present invention has a ratio in optical intensity between the input and output lights is made higher than 56 dB so that the optical element can be satisfactorily used as high-speed optical attenuator which are compact in size and light in weight.

What is claimed is:

1. An optical modulating/switching device comprising:
   a substrate having a refractive index which varies in accordance with an electric field applied to said substrate;
   an optical waveguide arranged on said substrate; and
   flat electrodes disposed asymmetrically about said optical waveguide, an electric field being applied through said flat electrodes to said substrate and said optical waveguide so that a refractive index of a portion of said substrate in the vicinity of said optical waveguide is varied to interrupt a light beam propagating through said optical waveguide, said flat electrodes being so arranged with respect to said optical waveguide that an electric field between said flat electrodes distributes asymmetrically about said optical waveguide.

2. An optical modulating/switching device as claimed in claim 1, wherein:
   said optical waveguide is straight;
   a first flat electrode of said flat electrodes is aligned with one side edge of said optical waveguide; and
   a second flat electrode of said flat electrodes is spaced apart by a predetermined distance from the other side edge of said optical waveguide.

3. An optical modulating/switching device as claimed in claim 2, wherein impurities for increasing a refractive index of said substrate are diffused into a portion of said substrate adjacent to said one side edge of said optical waveguide, a portion of said optical waveguide under said first flat electrode and a portion of said substrate adjacent thereto.

4. An optical modulating/switching device as claimed in claim 2, wherein impurities for reducing a refractive index of said substrate are diffused in a portion of said substrate between a portion adjacent to said one side edge of said optical waveguide and said second flat electrode, a portion under said second flat electrode and a portion adjacent thereto.

5. An optical modulating/switching device as claimed in claim 2, wherein:
   a portion of said first flat electrode is disposed on said optical waveguide.

6. An optical modulating/switching device as claimed in claim 5, wherein impurities for reducing a refractive index of said substrate are diffused in a portion of said substrate under said first flat electrode and a portion of said substrate adjacent thereto.

7. An optical modulating switching device as claimed in claim 5, wherein impurities for increasing a refractive index of said substrate are diffused into a portion of said substrate between a portion adjacent to said one side edge of said optical waveguide and said second flat electrode, a portion of said substrate under said second flat electrode and a portion of said substrate adjacent thereto.

8. A device according to claim 5, wherein said waveguide is embedded in a thin film layer which has an index of refraction different from that of said waveguide.

9. An optical modulating/switching device as claimed in claim 5, wherein a third flat electrode of said flat electrodes is disposed on said substrate and spaced apart by a predetermined distance from said first flat electrode on the side opposite to said second flat electrode with respect to said optical waveguide.

10. An optical modulating/switching device as claimed in claim 9, wherein impurities for reducing a refractive index of said substrate are diffused in a portion of said substrate under said first flat electrode and a portion of said substrate adjacent thereto.

11. An optical modulating switching device as claimed in claim 9, wherein impurities for increasing a refractive index of said substrate are diffused into a portion of said substrate between a portion adjacent to said one side edge of said optical waveguide and said second flat electrode, a portion of said substrate under said second flat electrode and a portion of said substrate adjacent thereto.

12. An optical modulating/switching device as claimed in claim 1, wherein:
   said optical waveguide has a curved portion;
   said first flat electrode is disposed on the outer side of said optical waveguide in such a way that one side of said first flat electrode is spaced apart from the outer side edge of said curved portion of said optical waveguide by a predetermined distance; and
   said second flat electrode is disposed on the inner side of said curved portion of said optical waveguide in such a way that said second flat electrode is spaced apart from the inner side edge of said curved portion of said optical waveguide by a predetermined distance.

13. An optical modulating/switching device as claimed in claim 12, wherein impurities for reducing a refractive index of said substrate are diffused in a portion of said substrate between a portion adjacent to said one side edge of said optical waveguide and said second flat electrode, a portion under said second flat electrode and a portion adjacent thereto.

14. An optical modulating/switching device as claimed in claim 12, wherein impurities for increasing a refractive index of said substrate are diffused into a portion of said substrate adjacent to said one side edge of said optical waveguide, a portion of said optical waveguide under said first flat electrode and a portion of said substrate adjacent thereto.

15. An optical modulating/switching device as claimed in claim 1, wherein:
   said optical waveguide has a curved portion;
   said first flat electrode has a portion overlying said optical waveguide and is disposed on the inner side of said optical waveguide in such a way that one side edge of said flat electrode is spaced apart from the outer side edge of said curved portion of said optical waveguide by a predetermined distance; and
   said second flat electrode is disposed on the outer side of said curved portion of said optical waveguide and is spaced apart from said first flat electrode by a predetermined distance.

16. An optical modulating/switching device as claimed in claim 15, wherein impurities for reducing a refractive index of said substrate are diffused in a portion of said substrate under said first flat electrode and a portion of said substrate adjacent thereto.

17. An optical modulating/switching device as claimed in claim 15, wherein impurities for increasing a refractive index of said substrate are diffused into a portion of said substrate between a portion adjacent to said one side edge of said optical waveguide and said second flat electrode, a portion of said substrate under said second flat electrode and a portion of said substrate adjacent thereto.

18. An optical modulating/switching device as claimed in claim 15, wherein a third flat electrode of said flat electrodes is disposed on the inner side of said curved portion of said optical waveguide and is spaced apart from said first flat electrode by a predetermined distance.

19. An optical modulating/switching device as claimed in claim 18, wherein impurities for reducing a refractive index of said substrate are diffused in a portion of said substrate under said first flat electrode and a portion of said substrate adjacent thereto.

20. An optical modulating/switching device as claimed in claim 18, wherein impurities for increasing a refractive index of said substrate are diffused into a portion of said substrate between a portion adjacent to said one side edge of said optical waveguide and said second flat electrode, a portion of said substrate under said second flat electrode and a portion of said substrate adjacent thereto.

21. An optical modulating/switching device as claimed in claim 1, wherein:
said optical waveguide is straight;
a first flat electrode of said flat electrodes is spaced apart by a predetermined distance from one side edge of said optical waveguide; and
a second flat electrode of said flat electrodes is spaced apart by a predetermined distance from the other side edge of said optical waveguide.

22. An optical modulating/switching device as claimed in claim 21, wherein impurities for reducing a refractive index of said substrate are diffused in a portion of said substrate between a portion adjacent to said one side edge of said optical waveguide and said second flat electrode, a portion under said second flat electrode and a portion adjacent thereto.

23. An optical modulating/switching device as claimed in claim 21, wherein impurities for increasing a refractive index of said substrate are diffused into a portion of said substrate adjacent to said one side edge of said optical waveguide, a portion of said optical waveguide under said first flat electrode and a portion of said substrate adjacent thereto.

24. An optical modulating/switching device as claimed in claim 21, wherein:
a portion of said first flat electrode is disposed on said optical waveguide.

25. An optical modulating/switching device as claimed in claim 24, wherein impurities for reducing a refractive index of said substrate are diffused in a portion of said substrate under said first flat electrode and a portion of said substrate adjacent thereto.

26. An optical modulating/switching device as claimed in claim 24, wherein impurities for increasing a refractive index of said substrate are diffused into a portion of said substrate adjacent to said one side edge of said optical waveguide and said second flat electrode, a portion of said optical waveguide under said first flat electrode and a portion of said substrate adjacent thereto.

27. An optical modulating/switching device as claimed in claim 24, wherein a third flat electrode of said flat electrodes is disposed on said substrate and spaced apart by a predetermined distance from said first flat electrode on the side opposite to said second flat electrode with respect to said optical waveguide.

28. An optical modulating/switching device as claimed in claim 27, wherein impurities for reducing a refractive index of said substrate are diffused in a portion of said substrate under said first flat electrode and a portion of said substrate adjacent thereto.

29. An an optical modulating/switching device as claimed in claim 27, wherein impurities for increasing a refractive index of said substrate are diffused into a portion of said substrate adjacent to said one side edge of said optical waveguide and said second flat electrode, a portion of said optical waveguide under said first flat electrode and a portion of said substrate adjacent thereto.

30. An optical modulating/switching device as claimed in claim 1, wherein:
said optical waveguide has a curved portion;
said first flat electrode is disposed on the outer side of said optical waveguide in such a way that one side of said first flat electrode is aligned with the outer side edge of said curved portion of said optical waveguide; and
said second flat electrode is disposed on the inner side of said curved portion of said optical waveguide in such a way that said second flat elelctrode is spaced apart from the inner side edge of said curved portion of said optical waveguide by a predetermined distance.

31. An optical modulating/switching device as claimed in claim 30, wherein impurities for reducing a refractive index of said substrate are diffused in a portion of said substrate between a portion adjacent to said one side edge of said optical waveguide and said second flat electrode, a portion under said second flat electrode and a portion adjacent thereto.

32. An optical modulating/switching device as claimed in claim 30, wherein impurities for increasing a refractive index of said substrate are diffused into a portion of said substrate adjacent to said one side edge of said optical waveguide, a portion of said optical waveguide under said first flat electrode and a portion of said substrate adjacent thereto.

33. An optical modulating/switching device as claimed in claim 1, wherein:
said optical waveguide has a curved portion;
said first flat electrode has a portion overlying said optical waveguide and is disposed on the inner side of said optical waveguide in such a way that one side edge of said flat electrode is aligned with the outer side edge of said curved portion of said optical waveguide; and
said second flat electrode is disposed on the outer side of said curved portion of said optical waveguide and is spaced apart from said first flat electrode by a predetermined distance.

34. An optical modulating/switching as claimed in claim 33, wherein impurities for reducing a refractive index of said substrate are diffused in a portion of said substrate under said first flat electrode and a portion of said substrate adjacent thereto.

35. An optical modulating/switching device as claimed in claim 34, wherein impurities for increasing a refractive index of said substrate are diffused into a portion of said substrate adjacent to said one side edge of said optical waveguide and said second flat electrode, a portion of said optical waveguide under said first flat electrode and a portion of said substrate adjacent thereto.

36. An optical modulating/switching device as claimed in claim 33, wherein impurities for increasing a refractive index of said substrate are diffused into a portion of said substrate adjacent to said one side edge of said optical waveguide and said second flat electrode, a portion of said optical waveguide under said first flat electrode and a portion of said substrate adjacent thereto.

37. An optical modulating/switching device as claimed in claim 33, wherein a third flat electrode of said flat electrodes is disposed on the inner side of said curved portion of said optical waveguide and is spaced apart from said first flat electrode by a predetermined distance.

38. An optical modulating/switching device as claimed in claim 37, wherein impurities for reducing a refractive index of said substrate are diffused in a portion of said substrate under said first flat electrode and a portion of said substrate adjacent thereto.

39. The device of claim 5, wherein one of said electrodes is separated from said thin film layer by an insulating buffer layer.

* * * * *